May 5, 1959  J. H. ROUTLEDGE  2,885,021

HYDRAULIC POWER STEERING MECHANISM FOR TWO-WHEELED TRACTORS

Filed July 9, 1956  4 Sheets-Sheet 1

Inventor
James H. Routledge
Paul O. Pippel
Attorney

May 5, 1959 J. H. ROUTLEDGE 2,885,021
HYDRAULIC POWER STEERING MECHANISM FOR TWO-WHEELED TRACTORS
Filed July 9, 1956 4 Sheets-Sheet 2
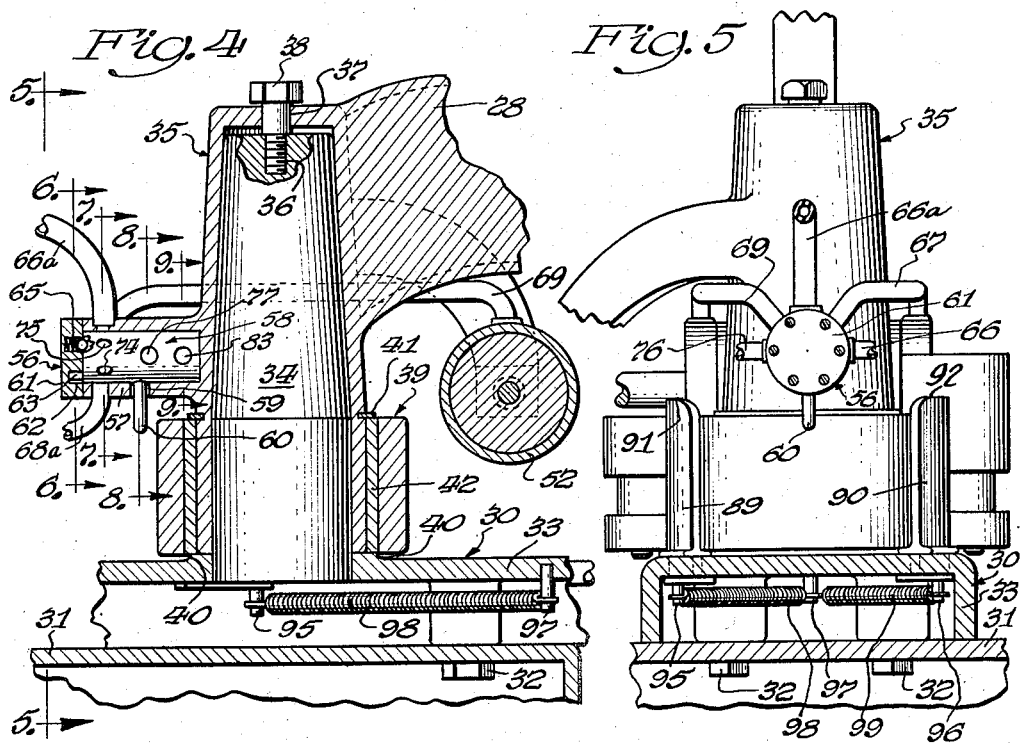
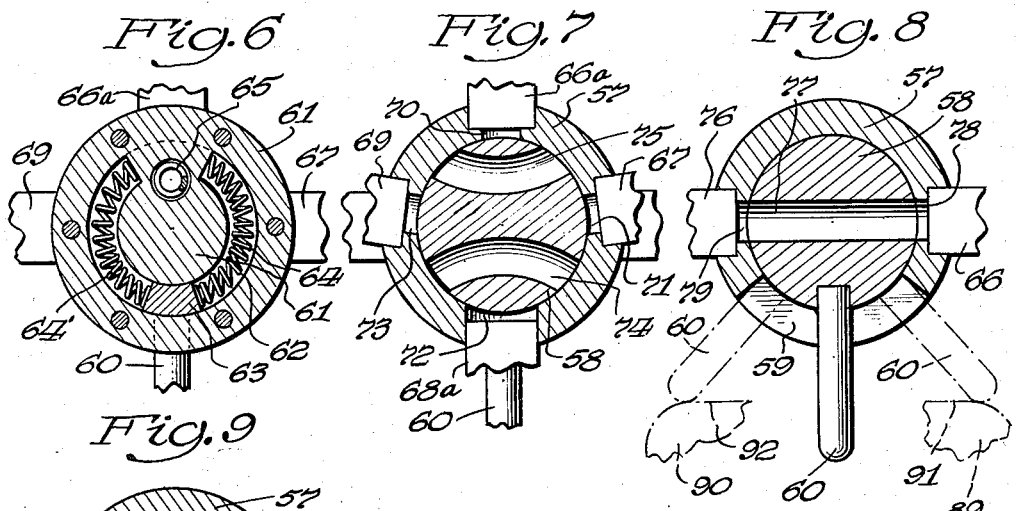
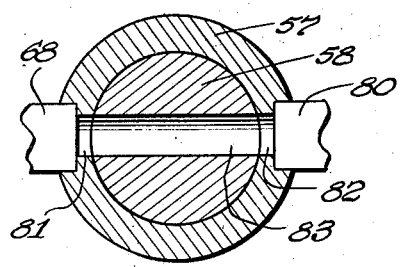
Inventor
James H. Routledge
Paul O. Pippel
Attorney

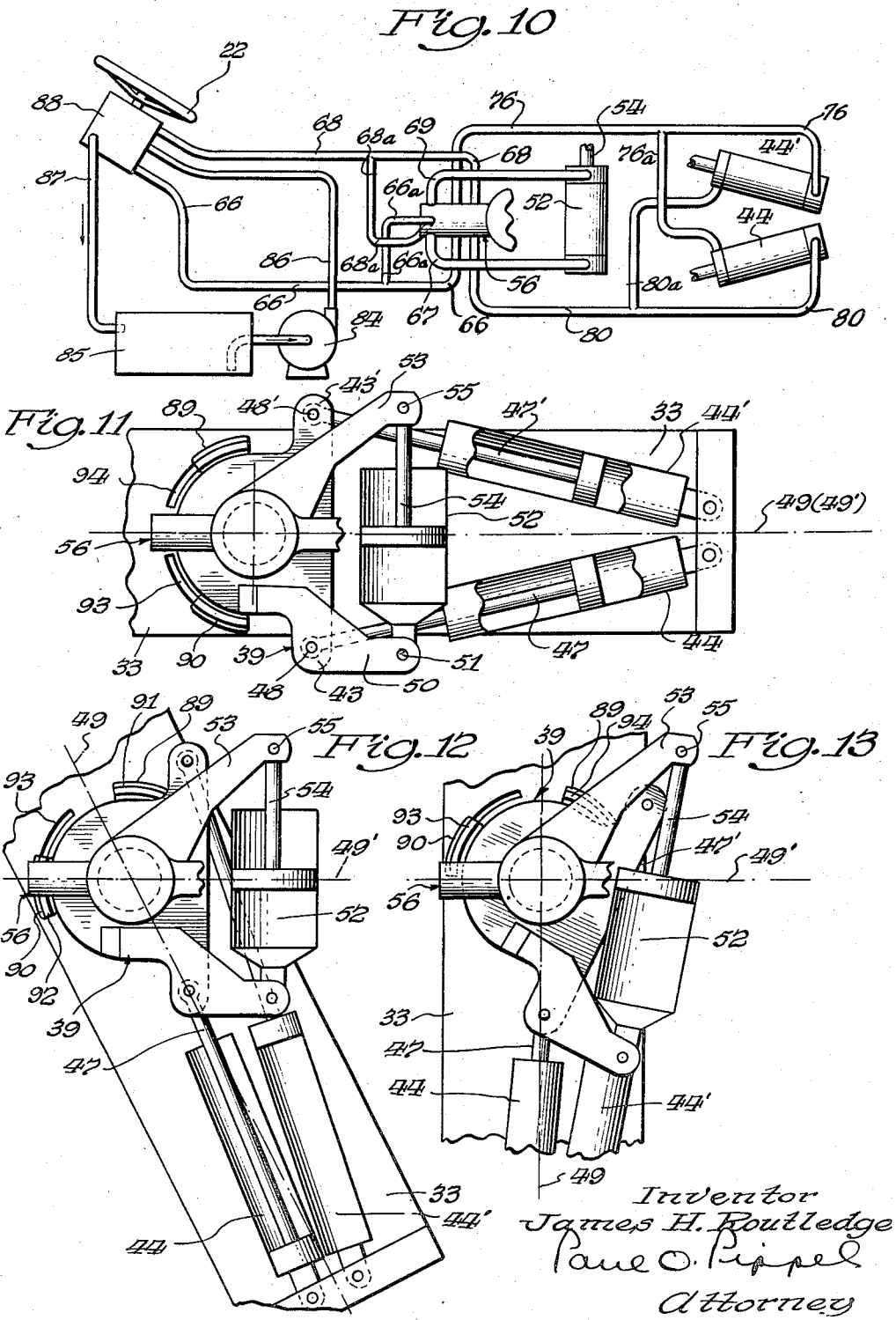

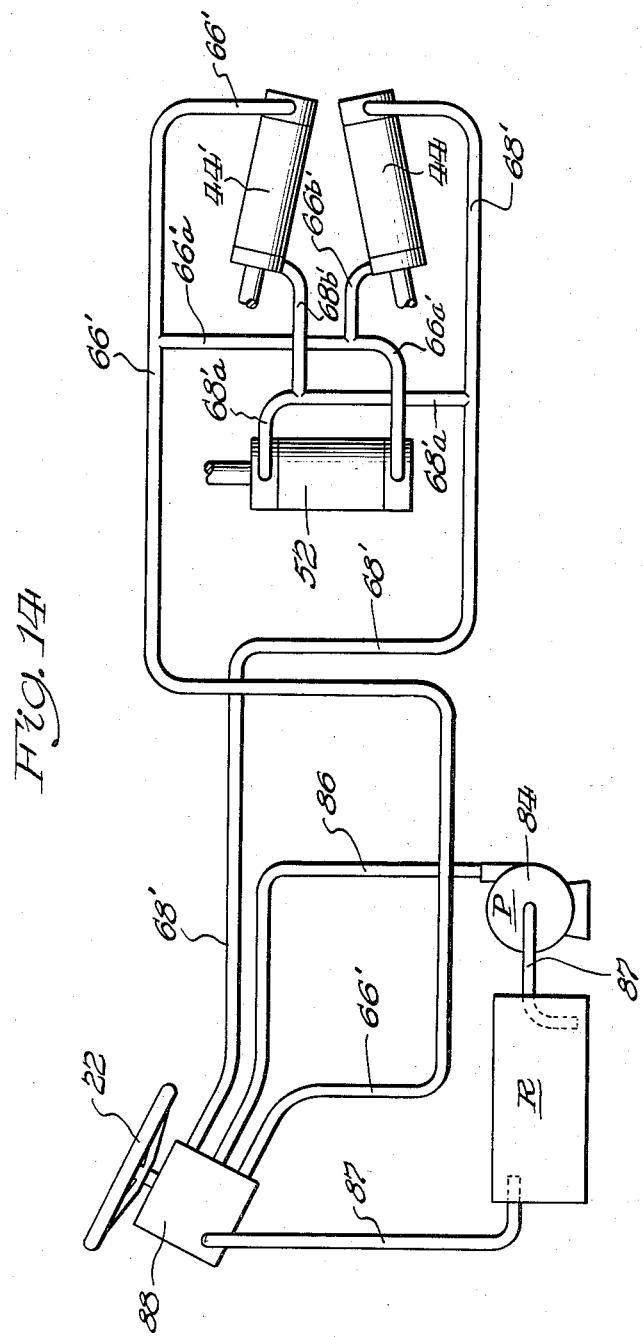

United States Patent Office 2,885,021
Patented May 5, 1959

2,885,021

HYDRAULIC POWER STEERING MECHANISM FOR TWO-WHEELED TRACTORS

James H. Routledge, Bellwood, Ill., assignor to International Harvester Company, a corporation of New Jersey Application July 9, 1956, Serial No. 596,488

12 Claims. (Cl. 180—79.2)

This invention relates to a power operated steering device for a two-wheeled tractor and its associated trailer vehicle. More in particular this invention relates to a power operated steering device for pivotally turning a two-wheeled tractor a full 90° in either a leftward or rightward direction with respect to its associated trailer vehicle.

Most of the known types of steering devices for two-wheeled tractors and their associated trailer vehicles have a distinct disadvantage in that when steering or turning away from a straight course of travel as the tractor approaches an angular displacement of about 60° or more with respect to the axis of the trailer, the resultant forces urging further angular movement become appreciably diminished. In most of the known designs the reduction in torsional urge beyond about 60° angular displacement becomes so great that unless exceedingly large and costly motors are employed effective steering beyond about 60° displacement is difficult if not impossible to attain. In such designs it is not possible to attain an angular displacement of 90° in either direction of the tractor with respect to its associated trailer vehicle.

Of the known designs of steering devices which are capable of turning the tractor a full 90° in either direction with respect to its associated trailer employs ratchets and pinion gear or a chain and sprocket wheel having teeth of large order in order to withstand the necessary forces which of course are not only expensive but requires much space.

The prime object of the present invention is to provide a power steering device having one motor for urging an angular displacement of a two-wheeled tractor with respect to its trailer vehicle up to approximately 60° and another motor which carries the angular displacement from approximately 60° to at least a full 90°.

Another object of the invention is to provide a power steering device according to the preceding object having means for locking against movement one motor while the other motor is in operation thus making the locked motor a part of the linkage between the tractor and its associated trailer vehicle.

A further object of the invention is the provision of means for automatically shifting the locking of one motor to that of the other motor as the tractor is pivoted beyond a predetermined angular displacement with respect to its associated trailer vehicle.

A still further object of the invention is to provide a power steering device in accordance with the preceding objects, having no ratchets, gears, sprockets, chains and the like.

A yet further object of the invention is to provide a power steering device according to the preceding objects, of low cost and relatively small space requirement.

These and other desirable objects inherent in and encompassed by the invention will be more readily understood from the ensuing description of the following described embodiments, the appended claims and the annexed drawings wherein:

Figure 4 is a sectional view taken on line 4—4 of Figure 3 illustrating the construction more in detail.

Figure 5 is an end view of the external construction of the steering device of this invention taken on line 5—5 of Figure 4 illustrating parts not apparent in Figures 2 and 3.

Figure 6 is a sectional view of the locking member taken on line 6—6 of Figure 4 illustrating the resilient mechanism for urging the member toward one position.

Figure 7 is another sectional view of the locking member taken on line 7—7 of Figure 4 illustrating the details of valving the power input and return to one of the motors.

Figure 8 is still another sectional view of the locking member taken on line 8—8 of Figure 4 illustrating the operating means of said member as well as power input and return valving means to a motor.

Figure 9 is yet a further sectional view of the locking member illustrating the power input and return valving means to a motor.

Figure 10 is a schematic drawing illustrating the power circuits for energizing the motors.

Figure 11 is a plan view partly broken away and partly in schematic form illustrating the relative positions of the external parts of the invention when the tractor and associated trailer vehicle are in alinement for a straight course of travel.

Figure 12 is similar to Figure 11 except that it shows the relative position of the external parts of the invention when the tractor has been angularly displaced with respect to the trailer vehicle to approximately 60° in a rightward direction.

Figure 13 is similar to Figures 11 and 12 except that it shows the relative position of the external parts of the invention when the tractor has been angularly displaced with respect to the trailer vehicle to a full 90° in a rightward direction.

Figure 14 is a schematic drawing of the invention illustrating the power circuits for energizing the motors in a modified form of the invention.

Figure 1:
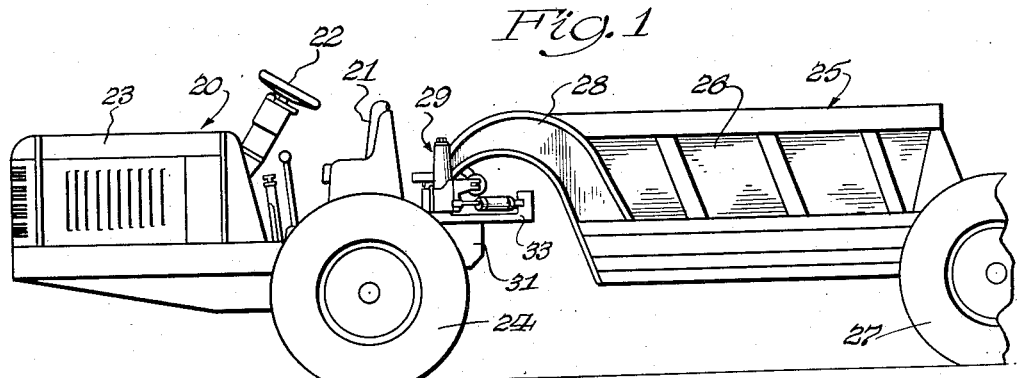
Figure 1 is a side view of a two-wheeled tractor connected to a trailer illustrating a general external view of the environment of the invention thereon.

With continued reference to the drawings, in Figure 1 the numeral 20 generally indicates a two-wheeled tractor having an operator's station 21, steering wheel 22, engine compartment 23, and the usual traction wheels one of which is shown at 24. The trailer vehicle, generally indicated at 25, may be comprised of a body 26 supported on the rearward portion thereof by laterally spaced trailer wheels one of which is partly shown at 27. The forward portion of the body 26 is provided with a supporting member 28 sometimes referred to as a "gooseneck." The forward portion of the supporting member 28 is pivotally mounted to the rearward portion of the tractor 20 to form what is often referred to as a "fifth wheel" pivot connection generally indicated at 29 which connection serves to connect pivotally the tractor 20 to its associated trailer vehicle 25. It should be understood that the trailer vehicle 25 may be any of the numerous well known utility implements such as a dump carrier for materials, road scrapers and the like.

It may well be appreciated that in order to steer the tractor and its associated trailer vehicle a torque must be applied at the fifth wheel pivot connection to urge pivotal movement of the tractor 20 with respect to the trailer vehicle 25. The arrangement of the various elements comprising the means for effecting a torsional urge at the fifth wheel pivot connection 29 is where the novel features of this invention resides.

Referring to Figure 4 in particular, a first fifth wheel pivot member, generally indicated at 30, is mounted on the rearward portion of the tractor frame 31 and secured thereto by a plurality of bolts 32 or the like. The first fifth wheel pivot member 30 may be comprised of a channel shaped base plate 33 supported by the tractor frame 31. An upwardly extending king pin 34 is rigidly mounted on the plate 33. The upper portion of the king pin 34 may be tapered in order to provide a thrust bearing surface to the downward load applied by the trailer vehicle through the gooseneck 28.

A second fifth wheel pivot member, generally indicated at 35, is rigidly connected to and is a part of the gooseneck 28 at the forward end portion thereof. The member 35 is constructed to fit over the king pin 34 in a co-operating pivotal relation. Thus the member 35 is rotatable about the vertical axis of the king pin 34. The upper end of the king pin 34 is provided with an axially disposed threaded bore 36. A corresponding bore 37 is provided on the top of the member 35 through which a bolt 38 is threaded for reception into the bore 36 thereby securing the pivot member 35 rotatably to the king pin 34. Thus the pivot member 35 is prevented from vertical movement with respect to the king pin 34.

Journalled to the lower portion of the second fifth wheel pivot member 35 for rotation about the axis of the king pin 34 is a collar or yoke generally indicated at 39. Vertical or axial movement of the collar 39 is prevented by an annular boss 40 disposed on the upper side of the base plate 33 and a snap ring 41 or the like disposed in a suitable annular groove on the member 35 as best shown in Figure 4. The collar 39 may be lined with a suitable bearing material 42 such as bronze or Babbitt metal or the like if desired.

Figure 2:
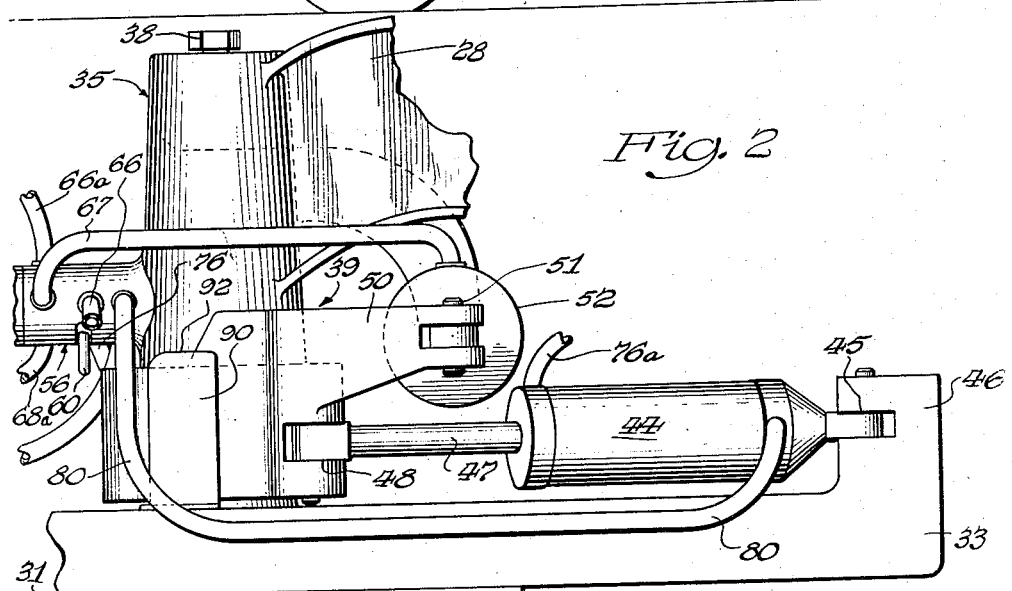
Figure 2 is a side view of the external construction of the steering device of this invention.
Figure 3:
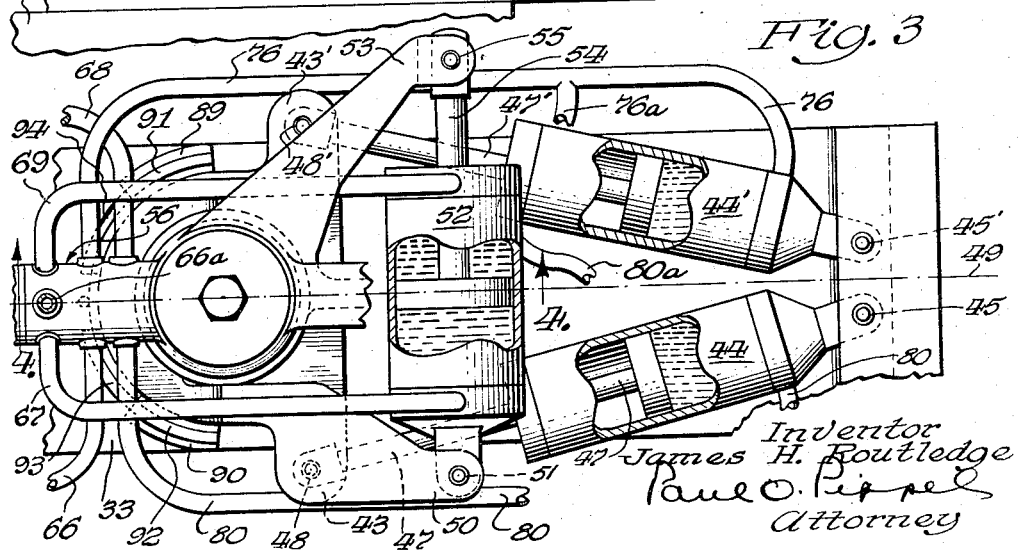
Figure 3 is a plan view of the external construction of the steering device of this invention illustrating the connections of the various parts thereof.

Referring now to Figures 2 and 3, the lower portion of the collar 39 is provided with a first moment arm 43 extending outwardly. Although not absolutely essential the collar 39 may also be provided with another or supplementary first moment arm 43' extending outwardly and in symmetrical relation with respect to the arm 43 and the axis of the king pin 34 as best illustrated in Figure 3.

A first reversible hydraulic ram or motor 44 is anchored pivotally at 45 to an upwardly extending portion 46 of the base plate 33 as best shown in Figures 2 and 3. The work member 47 of the motor 44 is pivotally connected at 48 to the outer end portion of the first moment arm 43 of the collar 39. As best shown in Figure 3, a supplemental first hydraulic ram or motor 44' may be mounted on the base plate 33 in symmetrical relation with the longitudinal axis 49 of the tractor 20. The ram 44' is pivotally anchored to the plate 33 at 45' and its work member 47' is pivotally connected to the outer end portion of the supplementary first moment arm 43' of the collar 39 at 48'. At this point it should be stated that the supplementary ram 44' may be employed where it is desirable to reduce the size of the ram 44 and associated space requirements. Thus it may be seen that combinedly the rams or motors 44 and 44' may be considered as a single motor or power unit as they both function to perform a single result, namely, to urge rotatively the collar 39 about its vertical axis with respect to the tractor 20 and except perhaps for space requirements or cost the motor 44 may well be enlarged proportionately thereby eliminating the necessity of the motor 44'.

On the upper portion of the collar 39 is a second moment arm 50 extending outwardly therefrom as shown in Figures 2 and 3. On the outer end portion of the arm 50 is mounted pivotally at 51 a second reversible hydraulic ram or motor 52. The upper portion of the second fifth wheel pivot member 35 is provided with an outwardly or radially extending third moment arm 53 as best illustrated in Figure 3. The arm 53 is rigidly connected to the member 35. The work member 54 of the ram 52 is pivotally connected at 55 to the outer end portion of the third moment arm 53 as best shown in Figure 3. From this it will be seen that the operation of the ram 52 urges pivotal movement of the arm 53 with respect to the collar 39.

At this point it should be apparent that in order to apply torque for steering to the first fifth wheel pivot member 30 associated with the tractor 20 with respect to the second fifth wheel pivot member 35 associated with the trailer vehicle 25, the linkage for applying the torque for steering is through the first ram 44 to the collar 39 and from the collar 39 through the second ram 52 to the arm 53 of the member 35. Frequently space limitations prohibit the employment of a second ram 52 and its associated moment arms 50 and 53 having characteristics comparable in mechanical advantage with the first ram 44 and its associated first moment arm 43 which may include ram 44' and arm 43'. In such instances it becomes necessary to provide means for locking against movement the first ram 44 and 44' while the second ram 52 is in operation or in the alternative the second ram 52 must be locked against movement while the first ram 44 and 44' is in operation. Otherwise the ram 52 having the lesser mechanical advantage would be driven in a direction opposite to the direction urged by the fluid pressure applied thereto resulting in unpredictable steering until the ram 44 reached its stroke limit. This is hazardous and of course undesirable. In order to overcome this difficulty means are now described for locking against movement one of the motors while the other motor is in operation. Further means are described for automatically shifting or alternating the locking of the motors when the tractor reaches a predetermined angular displacement with respect to the trailer vehicle.

As mentioned previously it has been found that the first motors 44 and 44' are quite capable of effecting an angular displacement of the tractor with respect to the trailer up to approximately 60° or even somewhat greater without too much loss in mechanical advantage. Beyond about 65° displacement however the mechanical advantage in further displacement is seriously diminished and the force necessary of the motor 44 would approach infinite as the displacement approaches 90°.

From Figure 3 it becomes apparent that if the second motor 52 is locked against movement at the midpoint of its stroke movement of the motor 44 in either direction will effect an angular displacement of the tractor 20 with respect to the trailer vehicle 25 in a corresponding direction. From the above discussion it is desirable to lock the motor 52 against movement for all angular displacements of the tractor 20 with respect to the trailer up to approximately 60°. Further displacement to 90° should be effected by movement of the motor 52 while the motor 44 is locked against movement.

In order to lock alternately one of the motors 44 or 52 a locking member generally indicated at 56 is provided. The locking member 56 is basically a multi-circuit valve or hydraulic locking valve having three operating positions. Referring to Figures 4 and 6 through 10 the locking member 56 may be comprised of a tubular shaped housing 57 mounted rigidly on the second fifth wheel pivot member. A cylindrically shaped plunger 58 is disposed rotatably in the housing 57. On the under side of the housing 57 is a peripherally disposed slot 59 as shown in Figures 4 and 8. A follower element 60 is rigidly connected to and depending from the plunger 58 through the slot 59. A cap 61 is secured to the outer end of the housing 57 by any conventional means to prevent axial movement of the plunger 58.

The cap 61 is provided with a recessed groove 62 circular in character but not extending a full 360° as best illustrated in Figure 6. A finger 63 rigidly connected to and extending longitudinally from the plunger 58 is positioned to move circumferentially in the groove 62 as shown in Figure 6. A pair of suitable helical captive springs 64 and 64' are disposed in the groove 62, one on each side of the finger 63 in opposed relation. Thus from Figure 6 it can be seen that the finger 63 and its associated plunger 58 is urged to a first position. In order to assure stability in this first position an ordinary ball and spring detent mechanism 65 may be employed. Thus the plunger 58 and its associated follower element 60 and finger 63 are constantly urged toward the first position illustrated in Figure 6. However if force is applied to the follower element 60 in sufficient magnitude in either a clockwise or counter-clockwise direction it rotates correspondingly the plunger 58 as illustrated in broken lines in Figure 8.

Figure 7 illustrates a sectional view of the first valving mechanism of the locking member 56. Four conduits 66a, 67, 68a and 69 are shown communicatively connected, respectively, to ports 70, 71, 72, and 73. The plunger 58 is provided with a pair of separate passages 74 and 75. The passages 74 and 75 are positioned so that when the plunger 58 is in the first position as illustrated in Figure 7 the passages 74 and 75 are not in registration with the ports 70, 71, 72 and 73. However from the positioning of the passages 74 and 75 in the plunger 58, it can be seen that movement of the plunger 58 rotatively in a clockwise direction to a second position the passage 74 registers with ports 72 and 73 thereby communicatively connecting the conduits 68a and 69. Simultaneously the passage 75 registers with ports 70 and 71 thereby communicatively connecting conduits 66a and 67. Conversely if the plunger 58 is moved rotatively in a counter-clockwise direction to a third position the passage 74 registers with ports 71 and 72 thereby communicatively connecting conduits 67 and 68a and at the same time passage 75 registers with ports 70 and 73 thereby communicatively connecting conduits 66a and 69. Thus it may be seen if the follower element 60 is in the first position shown in Figures 7 and 8, the conduits 66a, 67, 68a and 69 are not in communication with each other through the passages 74 and 75 of the plunger 58. When the follower element 60 is moved clockwise to the second position shown in dotted lines of Figures 8, the conduit 68a communicates with the conduit 69 through the passage 74 and the conduit 66a communicates with the conduit 67 through the passage 75. On the other hand if the follower element 60 is moved counter-clockwise to the third position shown in dotted lines of Figure 8, the conduit 68a communicates with the conduit 67 through the passage 74 and the conduit 66a communicates with the conduit 69 through the passage 75.

Figure 8 illustrates a sectional view of the second valving mechanism of the locking member 56. Two conduits 66 and 76 are shown communicatively connected, respectively, to ports 78 and 79. The ports 78 and 79 are disposed transversely in the housing 57 in rearward spaced relation with respect to ports 71 and 73. Positioned in registerable relation with the ports 78 and 79 is passage 77 in the plunger 58. The passage 77 is positioned to register with the ports 78 and 79 when the plunger 58 is in the first position as illustrated in Figure 8 thereby communicatively connecting conduits 66 and 76. However, when the follower element 60 is moved clockwise to the second position or counter-clockwise to the third position previously mentioned and illustrated in dotted lines on Figure 8, the passage 77 is moved out of registration with the ports 78 and 79 thereby terminating communication between conduits 66 and 76.

Figure 9 illustrated a sectional view of the third valve mechanism of the locking member 56. Two conduits 68 and 80 are shown communicatively connected, respectively, to ports 81 and 82. The ports 81 and 82 are disposed transversely in the housing 57 in rearward spaced relation with respect to ports 78 and 79. Positioned in registerable relation with the ports 81 and 82 is passage 83 in the plunger 58. The passage 83 is in parallel spaced relation with respect to the passage 77. The passage 83 is positioned to register with the ports 81 and 82 when the plunger 58 is in the first position as illustrated in Figure 8 thereby communicatively connecting conduits 68 and 80. However when the follower element 60 is moved clockwise to the second position or counter-clockwise to the third position previously mentioned and illustrated in dotted lines on Figure 8, the passage 83 is moved out of registration with the ports 81 and 82 thereby terminating communication between conduits 68 and 80.

Reference is now made to Figure 10 which illustrates in schematic form the power circuit. The numeral 22 designates the rotatable operator's steering wheel. The numeral 84 indicates a pump or other power source on the tractor 20. Where the medium of the source of power is fluid under pressure such as oil the reservoir 85 is provided in a conventional manner. The conduit 86 connects the pressure side of the pump 84 to the steering control valve 88 and the discharge conduit 87 connects the discharge side of the steering control valve 88 with the inlet of the pump 84 through the reservoir 85. The steering control valve 88 may be of conventional construction whereby in neutral position the fluid pressure from the pump 84 through the conduit 86 is discharged or by-passed to the reservoir 85 through the conduit 87. When the wheel 22 is rotated clockwise from the neutral position the valve 88 causes communication of the conduit 86 with the conduit 66 and simultaneously connects communicatively the conduit 68 with the conduit 87. Conversely, if the wheel 22 is rotated counter-clockwise from the neutral position the valve 88 causes communication of the conduit 86 with the conduit 68 and simultaneously connects communicatively the conduit 66 with the conduit 87.

From Figure 10 it may also be seen that the conduit 76 communicates with the forward cylinder chamber of the motor 44 (through branch conduit 76a) and the rearward cylinder chamber of the motor 44'. Conduit 80 communicates with the forward cylinder chamber of the motor 44' (through branch conduit 80a) and the rearward cylinder chamber of the motor 44. Thus fluid pressure in the conduits 76 and 76a causes the motors 44 and 44' to urge movement of the collar 39 in one direction while on the other hand fluid pressure in the conduits 80 and 80a causes the motors 44 and 44' to urge movement of the collar 39 in the other direction. Conduit 69 connects with the piston rod end cylinder chamber of the motor 52 while the conduit 67 connects with the opposite end cylinder chamber of the motor 52. Thus fluid pressure in the conduit 67 urges expansion of the work member 54 of the motor 52 while on the other hand fluid pressure in the conduit 69 urges retraction of the work member 54 of the motor 52.

Now in order to effect the operation of the plunger 58 of the locking member 56 in either a clockwise or counter-clockwise direction as the angular displacement of the tractor 20 approaches approximately 60° with respect to the trailer vehicle 25, a pair of symmetrically disposed cams 89 and 90 are mounted on the base plate 33 of the first fifth wheel pivot member 35 as shown in Figures 2, 3, 11, 12 and 13. The cams 89 and 90 extend upward from the plate 33 such that the cam surfaces 91 and 92 may properly engage the follower element 60 as the locking member 56 moves arcuately about the vertical axis of the king pin 34. However since the arcuate travel of the locking member 56 may be a full 180° it can be appreciated that the collar 39 will come into abutting relation to one or the other of the cams 89 and 90. Therefore the cams 89 and 90 must be movably mounted on the base plate 33 so that a limited arcuate travel is permitted in a generally forward direction about the vertical axis of the king pin 34. Referring now to Figures 3, 11, 12 and 13 it will be seen that a pair of arcuate slots 93 and 94 are provided in the forward portion of the base plate 33. The base portions of the cams 89 and 90 are constructed arcuately to fit the slots 94 and 93 as best shown in Figure 5. A depending pin 95 extends downward from the cam 89 and similarly a depending pin 96 extends downwardly from the cam 90 as best shown in Figure 5. An anchor pin 97 is rigidly mounted on the under side of plate 33 and depends downwardly as shown in Figures 4 and 5. A helical spring 98 under tension is connected to the pins 95 and 97 and similarly a helical spring 99 under tension is connected to the pins 96 and 97. The springs 98 and 99 being under tension urges the cams 89 and 90 rearwardly along the tracks formed by the slots 93 and 94. From this it should be apparent that when the tractor 20 is steered in a rightward direction as the angular displacement approaches 90° the follower element 60 will be in engagement with the surface 92 of cam 90 and the collar 39 engages the rearward edge of the cam 89 causing forward movement thereof in the arcuate slot 94. Conversely when the tractor 20 is steered in a leftward direction as the angular displacement approaches 90° the follower element 60 will be in engagement with the surface 91 of the cam 89 and the collar 39 engages the rearward edge of the cam 90 causing a forward movement thereof in the arcuate slot 93.

At this point it should be understood that the motors 44, 44' and 52 are not necessarily confined to hydraulic rams. Other types of motors may be used on this invention such as, for example, retractable-expansible electrically driven motors will function just as well. In such case of course the various fluid conduits are substituted with appropriate electric conductors and the locking member 56 is in the form of an electric switch which valves the electric current appropriately to obtain the same desired result. Of course in such case the pump 84 would be replaced with an electric generator and the steering control valve 88 would be in the form of an electric control switch.

As has been explained previously the employment of the locking member 56 is necessary in the case where space limitations do not permit the use of a sufficiently large motor 52 so that the resulting mechanical advantage of the second motor 52 is appreciably less than that of the combined first motor 44 and 44'. However in the case where space limitations are not critical so that the bore and stroke characteristics of the second motor 52 may be chosen to provide comparable mechanical advantage to that of the first motor 44 and 44' then a modified form of the invention may be advantageously used. The modified form of the invention has the advantage of eliminating the necessity of the locking member 56.

Referring to Figure 14 which illustrates the connections of the various conduits or conductors of the modified form of the invention. By comparison with Figure 10 it will be seen that conduits or conductors 68, 69, 80a and 80 are connected together to form conduit or conductor 68' with branches 68a' and 68b'. Similarly conduits or conductors 66, 67, 76a and 76 are connected together to form conduit or conductor 66' with branches 66a' and 66b'. Thus the locking member 56 is removed from the circuit and the first and second rams 44 and 52 are hydraulically connected in parallel arrangement.

*Operation*

Consider first the condition where the longitudinal axis 49 of the tractor 20 is in alinement with the longitudinal axis 49' of the trailer 25. Thus the tractor and trailer are alined for travel in a straight course. In this condition the operator's steering wheel 22 and its associated steering control valve 88 are in neutral position thereby by-passing fluid inlet from the pump 84 through the conduit 86 into the discharge conduit 87 while preventing flow of fluid through conduits 66 and 68. From Figures 5, 7 and 11 it is apparent that the follower element 60 of the locking member 56 is not in engagement with either of the cams 89 and 90. Therefore the locking member 56 is in the first position previously discussed whereby the ports 70, 71, 72 and 73 of the first valving mechanism are closed as shown in Figure 7. Since the ports 71 and 73 are closed the conduits 67 and 69 and the ram 52 are under hydraulic lock which fixes rigidly the distance between the pivotal connections 51 and 55 of the second moment arm 50 and the third moment arm 53 respectively. As the locking member 56 is in the first position it may be seen from Figure 8 that the second valving mechanism is in open position whereby fluid communication is established between conduits 66 and 76. Similarly the third valving mechanism of the locking member 56 is also in open position as shown in Figure 9 whereby fluid communication is established between conduits 68 and 80. However since the steering control valve 88 is in a neutral condition, except for the fluid by-pass circuit from the pump 84 through the conduit 86 and control valve 88 into the discharge conduit 87, the entire system is under hydraulic lock.

Now suppose the operator desires to steer the tractor 20 rightwardly from a straight course of travel until the angular displacement of the tractor is a full 90° to the right with respect to the trailer vehicle 25. The operator in the usual manner rotates the steering wheel 22 clockwise which shifts the steering control valve 88 so that communication is established between the fluid pressure conduit 86 from the pump 84 to the conduit 66. Simultaneously the conduit 68 is caused to communicate with the discharge conduit 87. Since the second valving mechanism of the locking member 56 is in the open position as shown in Figure 8 fluid communication is established from the conduit 66 to the conduit 76. The conduit 76 now under fluid pressure communicates with the rearward chamber of the ram 44' and the forward chamber of the ram 44 through branch conduit 76a thereby energizing the rams 44 and 44' to urge rotation of the collar 39 with respect to the tractor from the position shown in Figure 11 toward the position shown in Figure 12. The third valving mechanism of the locking member 56 being in the open position as shown in Figure 9 permits discharge of fluid from the rearward chamber of the ram 44 and the forward chamber of the ram 44' by communicating the conduit 80 and associated branch conduit 80a with conduit 68. The first valving mechanism of the locking member 56 is in a closed position as shown in Figure 7.

Now as the angular displacement of the tractor 20 with respect to the trailer 25 approaches the position shown in Figure 12, the follower element 60 is engaged by the cam surface 92 of the cam 90 causing the plunger 58 of the locking member 56 to rotate clockwise to a second position as shown in dotted lines of Figure 8. This movement of the plunger 58 causes the passage 77 of Figure 8 to move out of registration with the ports 78 and 79. Likewise the passage 83 of Figure 9 will also move out of registration with the ports 81 and 82. Thus conduits 76, 76a, 80a and 80 become hydraulically locked and therefore the rams 44 and 44' become hydraulically locked in the position shown in Figure 12. Simultaneously the clockwise movement of the plunger 58 causes corresponding movement of the first valving mechanism shown in Figure 7 whereby the passage 75 registers with ports 70 and 71 communicating fluid under pressure from conduit 66a to the conduit 67. From Figure 10 is is seen that the conduit 67 communicates with the non-piston rod end chamber of the ram 52. Also the passage 74 of Figure 7 registers with the ports 72 and 73 thereby discharging fluid from the piston rod end chamber of the ram 52 through conduit 69 to conduit 68a and thence to conduit 87.

Since the rams 44 and 44' have become hydraulically locked through the action of the locking member 56 the collar 39 is locked against any rotational movement with respect to the tractor. The ram 52 now energized expands urging the pivotal point 51 of the second moment arm 50 further apart from the pivotal point 55 of the third moment arm 53 until the position shown in Figure 13 is attained whereby the tractor reaches an angular displacement of 90° with respect to the trailer.

In order to return from the position shown in Figure 13 to the position illustrated in Figure 11 the operator first moves the steering wheel 22 in a counterclockwise direction past the neutral position which causes communication of the fluid pressure conduit 86 with the conduit 68 while at the same time connecting the discharge conduit 87 with the conduit 66. Fluid under pressure from the conduit 68 through branch 68a enters the conduit 69 through the passage 74 into the piston rod end chamber of the ram 52 urging retraction thereof. The discharge of fluid from the opposite end of the ram 52 passes through the conduit 67, passage 75 into the branch conduit 66a which is now in communication with the discharge conduit 87 as previously explained.

When the ram 52 has retracted from the position shown in Figure 13 to the position shown in Figure 12 the follower element 60 of the locking member 56 becomes disengaged from the surface 92 of the cam 90 and the plunger 58 returns to the first position illustrated in Figures 6, 7, 8 and 9. The ram 52 thereupon again becomes hydraulically locked in the position shown in Figures 11 and 12 and simultaneously the rams 44 and 44' become energized in the opposite direction to move the collar 39 with respect to the tractor until the tractor is again in a straight course of travel position as illustrated in Figure 11. Unless the operator returns the steering wheel to the neutral position at this time, it should be understood that the movement of the tractor 20 with respect to the tractor would continue in a leftward direction in the same manner as heretofore described until the angular displacement reached 90° in the leftward direction or 180° from that poistion illustrated in Figure 13.

It should be mentioned at this point that due to fluid leakage between the piston and cylinder walls of the rams 52, 44 and 44' it is apparent that the rams may get out of phase from that shown in Figure 11. However re-phasing may be easily accomplished by merely opening the steering control valve 88 until an angular displacement of the tractor 20 with respect to the trailer 25 reaches a full 90° in the appropriate direction. The rams will then be in the correct phase relation with respect to each other.

In the modified form of the invention as shown schematically in Figure 14 the locking member 56 is omitted. The modified form is applicable only where space requirements permit the selection of the bore and stroke of the ram 52 as well as the radial lengths of the second moment arm 50 and third moment arm 53 such that the combination thereof provides a mechanical advantage comparable to the mechanical advantage provided by the combination of the bore and stroke characteristics of the rams 44 and 44' with the radial length of the first moment arms 43 and 43'. Thus all of the rams may be energized simultaneously and may all move in unison. However, should the rams move out of phase relation with respect to each other, the ram having the best mechanical advantage due to its position will obviously move first and continue to move until it reaches a position where it no longer has the best mechanical advantage at which positions the other ram begins to move. Thus the rams will maintain a phased relation with each other.

Having thus described the foregoing embodiments of the invention it can now be seen that the objects of the invention have been fully achieved and it must be understood that changes and modifications may be made which do not depart from the spirit of the invention nor from the scope thereof as defined in the appended claims.

What is claimed is:

1. In combination, a two-wheeled tractor, a trailer vehicle, a first fifth wheel pivot member mounted on said tractor, a co-operating second fifth wheel pivot member mounted rotatably on said first fifth wheel pivot member and connected to said trailer vehicle, a collar mounted and journalled for rotation on one of said fifth wheel pivot members, said collar being positioned concentrically with respect to the rotational axis of said pivot members, a first motor mounted on said tractor and operatively connected to urge said collar rotatively with respect to said tractor, a second motor mounted on said trailer vehicle and operatively connected to urge said collar rotatively with respect to said second fifth wheel pivot member, and means for alternately energizing one of said motors while the other of said motors is locked against movement.

2. In combination, a two-wheeled tractor, a trailer vehicle, a first fifth wheel pivot member mounted on said tractor, a co-operating second fifth wheel pivot member mounted rotatably on said first fifth wheel pivot member and connected rigidly to said trailer vehicle, a collar mounted rotatably on said second fifth wheel pivot member, said collar being positioned for rotative movement concentrically with respect to the axis of rotation of said second fifth wheel pivot member, said collar having a first moment arm connected rigidly to and extending radially from the lower portion of said collar, a first reversible hydraulic ram pivotally mounted on said tractor and operatively connected to the outer end portion of said first moment arm of said collar, said collar having a second moment arm connected rigidly to and extending radially from the upper portion of said collar, said second fifth wheel pivot member having a third moment arm connected rigidly thereto and extending radially thereof, a second reversible hydraulic ram pivotally mounted on the outer end portion of said second moment arm of said collar and operatively connected to said third moment arm of said second fifth wheel pivot member, a source of fluid under pressure mounted on said tractor including a control valve therefor, an hydraulic locking member mounted on said second fifth wheel pivot member, a plurality of conduits communicatively connecting said locking member with said rams and said source of fluid under pressure, a follower element mounted on said locking member, said follower element being adapted for operating said locking member whereby fluid under pressure is directed to the first ram while hydraulically locking against movement the second ram and alternately directed to the second ram while hydraulically locking against movement said first ram, and a pair of cams mounted on said tractor positioned to engage said follower element for operating said locking member whereby said tractor is pivotally moved with respect to said trailer vehicle when one of said rams is energized.

3. In combination, a two-wheeled tractor, a trailer vehicle, a first fifth wheel pivot member mounted on said tractor, a co-operating second fifth wheel pivot member mounted rotatably on said first fifth wheel pivot member and connected rigidly to said trailer vehicle, a collar mounted rotatably on one of said fifth wheel pivot members, said collar being journalled for rotative movement concentrically with respect to the vertical rotational axis of said fifth wheel pivot members, said collar having a first moment arm connected rigidly to and extending radially from the lower portion of said collar, a first reversible hydraulic ram pivotally mounted on said tractor and operatively connected to the outer end portion of said first moment arm of said collar, said collar having a second moment arm connected rigidly to and extending radially from the upper portion of said collar, said second fifth wheel pivot member having a third moment arm connected rigidly thereto and extending radially thereof, a second reversible hydraulic ram pivotally mounted on the outer end portion of said second moment arm of said collar and operatively connected to said third moment arm of said second fifth wheel pivot member, a source of fluid under pressure mounted on said tractor including a control valve therefor, an hydraulic locking member mounted on said second fifth wheel pivot member, a plurality of conduits communicatively connecting said locking member with said rams and said source of fluid under pressure, a follower element mounted on said locking member, said follower element being adapted for operating said locking member whereby fluid under pressure is directed to the first ram while hydraulically locking against movement said second ram and alternately said fluid pressure is directed to the second ram while hydraulically locking against movement said first ram, and a pair of cams mounted on said tractor positioned to engage said follower element for operating said locking member whereby said tractor is pivotally moved with respect to said trailer vehicle when one of said rams is energized.

4. In combination, a two-wheeled tractor, a trailer vehicle, a first fifth wheel pivot member mounted on said tractor, a co-operating second fifth wheel pivot member mounted rotatably on said first fifth wheel pivot member and connected rigidly to said trailer vehicle, a collar mounted rotatably on one of said fifth wheel pivot members, said collar being journalled for rotative movement concentrically with respect to said fifth wheel pivot members, a first reversible hydraulic ram pivotally mounted on said tractor and operably connected to urge said collar rotatively with respect to said tractor, a second reversible hydraulic ram mounted on said collar and operably connected to urge said second fifth wheel pivot member rotatively with respect to said collar, a source of fluid under pressure on said tractor including a control valve therefor, an hydraulic locking member mounted on said second fifth wheel pivot member, a plurality of conduits communicatively connecting said locking member with said rams and said source of fluid under pressure, a follower element mounted on said locking member, said follower element being adapted for operating said locking member whereby fluid under pressure is directed to the first ram while hydraulically locking against movement said second ram and alternately said fluid pressure is directed to the second ram while hydraulically locking against movement said first ram, and a pair of cams mounted on said tractor positioned to engage said follower element for operating said locking member whereby said tractor is pivotally moved with respect to said trailer vehicle when one of said rams is energized.

5. In combination, a two-wheeled tractor, a trailer vehicle, a first fifth wheel pivot member mounted on said tractor, a co-operating second fifth wheel pivot member mounted rotatably on said first fifth wheel pivot member and connected rigidly to said trailer vehicle, a collar mounted rotatably on one of said fifth wheel pivot members, said collar being journalled for rotative movement concentrically with respect to said fifth wheel pivot members, a first reversible hydraulic ram pivotally mounted on said tractor and operably connected to urge said collar rotatively with respect to said tractor, a second reversible hydraulic ram mounted on said collar and operably connected to urge said second fifth wheel pivot member rotatively with respect to said collar, a source of fluid under pressure on said tractor including a control valve therefor, an hydraulic locking member mounted on one of said fifth wheel pivot members, a plurality of conduits communicatively connecting said locking member with said rams and said source of fluid under pressure, a follower element mounted on said locking member, said follower element being adapted for operating said locking member whereby fluid under pressure is directed to the first ram while hydraulically locking against movement said second ram and alternately said fluid pressure is directed to the second ram while hydraulically locking against movement said first ram, and cam means mounted on the other of said fifth wheel pivot members positioned to engage said follower element for operating said locking member whereby said tractor is pivotally moved with respect to said trailer vehicle when one of said rams is energized.

6. In combination, a two-wheeled tractor, a trailer vehicle, a first fifth wheel pivot member mounted on said tractor, a co-operating second fifth wheel pivot member mounted rotatably on said first fifth wheel pivot member and connected rigidly to said trailer vehicle, a collar mounted rotatably on one of said fifth wheel pivot members, said collar being positioned concentrically with respect to the rotational axis of said pivot members, a first reversible hydraulic ram pivotally mounted on said tractor and operably connected to urge said collar rotatively, a second reversible hydraulic ram mounted on said collar and operably connected to urge said second fifth wheel pivot member rotatively with respect to said collar, a source of fluid pressure on said tractor including a control valve therefor, an hydraulic locking member mounted on one of said fifth wheel pivot members, conduit means communicatively connecting said locking member with said rams and said source of fluid under pressure, a follower element mounted on said locking member, said follower element being adapted for operating said locking member whereby fluid under pressure is directed to the first ram while hydraulically locking against movement said second ram and alternately said fluid pressure is directed to the second ram while hydraulically locking against movement said first ram, and cam means mounted on the other of said fifth wheel pivot members positioned to engage said follower element for operating said locking member whereby said tractor is pivotally moved with respect to said trailer vehicle when one of said rams is energized.

7. In combination, a two-wheeled tractor, a trailer vehicle, a first fifth wheel member mounted on said tractor, a co-operating second fifth wheel pivot member mounted rotatably on said first fifth wheel pivot member and connected to said trailer vehicle, a collar mounted rotatably on one of said fifth wheel pivot members, said collar being positioned concentrically with respect to the rotational axis of said pivot members, a first reversible motor pivotally mounted on said tractor and operably connected to urge said collar rotatively, a second reversible motor mounted on said collar and operably connected to urge said second fifth wheel pivot member rotatively with respect to said collar, a source of power on said tractor including control means therefor, a locking member mounted on one of said fifth wheel pivot members, conductor means communicatively connecting said locking member with said motors and said source of power, a follower element mounted on said locking member, said follower element being adapted for operating said locking member whereby power is directed to the first motor while preventing movement of said second motor and alternately said power is directed to the second motor while preventing movement of said first motor, and cam means mounted on the other of said fifth wheel pivot members positioned to engage said follower element for operating said locking member whereby said tractor is pivotally moved with respect to said trailer vehicle when one of said motors is energized.

8. In combination, a two-wheeled tractor, a trailer vehicle, a first fifth wheel pivot member mounted on said tractor, a co-operating second fifth wheel pivot member mounted rotatably on said first fifth wheel pivot member and connected to said trailer vehicle, a collar mounted rotatably on one of said fifth wheel pivot members, said collar being positioned concentrically with respect to the rotational axis of said pivot members, a first motor mounted on said tractor and operably connected to urge said collar rotatively, a second motor mounted on said collar and operably connected to urge said second fifth wheel pivot member rotatively with respect to said collar, a source of power on said tractor including control means therefor, a locking member mounted on one of said fifth wheel pivot members, conductor means communicatively connecting said locking member with said motors and said source of power, a follower element mounted on said locking member, said follower element being adapted for operating said locking member whereby power is directed to the first motor while preventing movement of said second motor and alternately said power is directed to the second motor while preventing movement of said first motor, and means mounted on the other fifth wheel pivot member adapted to engage said follower element for actuating said locking member whereby said tractor is pivotally moved with respect to said trailer vehicle when one of said motors is energized.

9. In combination, a two-wheeled tractor, a trailer vehicle, a first fifth wheel pivot member mounted on said tractor, a co-operating second fifth wheel pivot member mounted rotatably on said first fifth wheel pivot member and connected to said trailer vehicle, a collar concentrically mounted and journalled for rotation on one of said fifth wheel pivot members, a first motor mounted on said tractor and operably connected to urge said collar rotatively, a second motor mounted on said collar and operably connected to urge said second fifth wheel pivot member rotatively with respect to said collar, a locking member mounted on one of said fifth wheel pivot members, said locking member being communicatively connected to said motors and a source of energy, and means mounted on the other fifth wheel pivot member for actuating said locking member whereby said first motor is energized while preventing actuation of said second motor and alternately preventing actuation of said first motor while said second motor is energized thereby urging pivotal movement of said tractor with respect to said trailer vehicle.

10. In combination, a two-wheeled tractor, a trailer vehicle, a first fifth wheel pivot member mounted on said tractor, a co-operating second fifth wheel pivot member mounted rotatably on said first fifth wheel pivot member and connected to said trailer vehicle, a collar concentrically mounted on one of said fifth wheel pivot members, said collar being journalled for free rotative movement in unrestrained angular displacement relation with respect to each of said fifth wheel pivot members, a first motor mounted on said tractor and operatively connected to urge said collar rotatively with respect to said tractor, a second motor mounted on said collar and operatively connected to urge rotatively said second fifth wheel pivot member with respect to said collar, said second motor having characteristics adapted to deliver substantially equivalent mechanical advantage as said first motor, and means for energizing said motors whereby one of said pivot members is moved rotatively with respect to the other said pivot member.

11. In combination, a two-wheeled tractor, a trailer vehicle, a first fifth wheel pivot member mounted on said tractor, a co-operating second fifth wheel pivot member mounted rotatably on said first fifth wheel pivot member and connected rigidly to said trailer vehicle, a collar mounted and journalled for rotation on said second fifth wheel pivot member, said collar being positioned for free rotative movement concentrically in unrestrained angular displacement relation with respect to each of said fifth wheel pivot members, said collar having a first moment arm connected rigidly to and extending radially from the lower portion of said collar, a first reversible hydraulic ram pivotally mounted on said tractor and operatively connected to the outer end portion of said first moment arm of said collar, said collar having a second moment arm connected rigidly to and extending radially from the upper portion of said collar, said second fifth wheel pivot member having a third moment arm connected rigidly thereto and extending radially thereof, a second reversible hydraulic ram pivotally mounted on the outer end portion of the second moment arm of said collar and operatively connected to said third moment arm of said second fifth wheel pivot member, said second hydraulic ram having characteristics adapted to deliver substantially equivalent mechanical advantage as said first hydraulic ram, a source of fluid under pressure mounted on said tractor including a control valve therefor, and means for communicatively connecting said rams with said source of fluid under pressure whereby said tractor is pivotally moved with respect to said trailer vehicle.

12. In combination, a two-wheeled tractor, a trailer vehicle, a first fifth wheel pivot member mounted on said tractor, a co-operating second fifth wheel pivot member mounted rotatably on said first fifth wheel pivot member and connected rigidly to said trailer vehicle, a collar mounted and journalled for rotation on one of said fifth wheel pivot members, said collar being positioned for free rotative movement concentrically in unrestrained angular displacement relation with respect to each of said fifth wheel pivot members, said collar having a first moment arm connected rigidly to and extending radially from the lower portion of said collar, a first reversible hydraulic ram pivotally mounted on said tractor and operatively connected to the outer end portion of said first moment arm of said collar, said collar having a second moment arm connected rigidly to and extending radially from the upper portion of said collar, said second fifth wheel pivot member having a third moment arm connected rigidly thereto and extending radially thereof, a second reversible hydraulic ram pivotally mounted on the outer end portion of said second moment arm of said collar and operatively connected to said third moment arm of said second fifth wheel pivot member, said second hydraulic ram having characteristics adapted to deliver substantially equivalent mechanical advantage as said first hydraulic ram, a source of fluid under pressure mounted on said tractor including a control valve therefor, and means for communicatively connecting said rams with said source of fluid under pressure whereby said tractor is pivotally moved with respect to said trailer vehicle.

References Cited in the file of this patent
UNITED STATES PATENTS 2,614,644    Gustafson    Oct. 21, 1952

FOREIGN PATENTS 745,519    Great Britain    Feb. 29, 1956